United States Patent
Ogawa et al.

(10) Patent No.: US 10,582,087 B2
(45) Date of Patent: Mar. 3, 2020

(54) IMAGE PROCESSING APPARATUS, CONTROL METHOD, AND NON-TRANSITORY COMPUTER-READABLE STORAGE MEDIUM

(71) Applicant: CANON KABUSHIKI KAISHA, Tokyo (JP)

(72) Inventors: Shuhei Ogawa, Kawasaki (JP); Tetsuya Suwa, Yokohama (JP); Hidetsugu Kagawa, Kawasaki (JP); Maya Yazawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/448,210

(22) Filed: Jun. 21, 2019

(65) Prior Publication Data
US 2020/0007712 A1   Jan. 2, 2020

(30) Foreign Application Priority Data
Jun. 29, 2018   (JP) ................................ 2018-125283

(51) Int. Cl.
*H04N 1/407*   (2006.01)
*H04N 1/60*   (2006.01)
*G06T 5/00*   (2006.01)

(52) U.S. Cl.
CPC ........... *H04N 1/4074* (2013.01); *G06T 5/009* (2013.01); *H04N 1/6027* (2013.01); *G06T 2207/20208* (2013.01)

(58) Field of Classification Search
CPC .... H04N 1/4074; H04N 1/6027; G06T 5/009; G06T 2207/20208
See application file for complete search history.

(56) References Cited

U.S. PATENT DOCUMENTS
9,652,687 B2   5/2017   Sato

FOREIGN PATENT DOCUMENTS
JP   2006-129105 A   5/2006
JP   2015-156615 A   8/2015

OTHER PUBLICATIONS

Achanta, Radhakrishna, et al., "SLIC Superpixels Compared to State-of-the-Art Superpixel Methods", IEEE Transactions on Pattern Analysis and Machine Intelligence, Nov. 2012, pp. 2274-2281, vol. 31, No. 11.

*Primary Examiner* — Christopher Wait
(74) *Attorney, Agent, or Firm* — Venable LLP

(57) ABSTRACT

An image processing apparatus for converting a first image having a first range of a brightness into a second image having a second range of the brightness narrower than the first range obtains information of sizes of the first range and the second range, divides the first image based on the information such that the number of areas obtained by dividing the first image when a ratio of the second range to the first range is a first value becomes smaller than that when the ratio is smaller than the first value, sets, for each of the areas, relationship information that associates input brightness values in the first range with output brightness values in the second range, and converts brightness values of pixels included in the first image into brightness values of pixels of the second image based on the relationship information.

17 Claims, 10 Drawing Sheets

FIG. 7A

| R (%) | | NORMAL MODE | HIGH BRIGHTNESS OBTAINING MODE |
|---|---|---|---|
| CAMERA MODEL | A | 220 | 440 |
| | B | 250 | 500 |
| | C | 260 | 520 |

FIG. 7B

| BRIGHTNESS VALUE (cd/m²) | | BLACK | WHITE |
|---|---|---|---|
| PAPER TYPE | I | 5 | 90 |
| | II | 10 | 88 |
| | III | 15 | 82 |

US 10,582,087 B2

IMAGE PROCESSING APPARATUS, CONTROL METHOD, AND NON-TRANSITORY COMPUTER-READABLE STORAGE MEDIUM

BACKGROUND OF THE INVENTION

This application claims the benefit of Japanese Patent Application No. 2018-125283, filed Jun. 29, 2018, which is hereby incorporated by reference herein in its entirety.

Field of the Invention

The present invention relates to a dynamic range compression technique for the brightness of an image.

Description of the Related Art

In recent years, HDR (High Dynamic Range) content having a reproduction range of a high brightness and wide color gamut has become popular. In HDR content, high-quality image expression using a wide brightness range by a highest brightness of 1,000 nit or more and a wide color gamut defined by Rec. 2020 is performed. On the other hand, when printing HDR image data by a printing apparatus such as an inkjet printer, the dynamic range (to be referred to as a "D range" hereafter) of the brightness needs to be compressed using gray scale conversion, or the like, into the D range of a brightness that the printing apparatus can reproduce. However, at the time of D range compression, the contrast lowers based on the characteristic of gray scale conversion. Japanese Patent Laid-Open No. 2006-129105 describes a method of dividing an input image into areas and, concerning a gray scale of a high appearance frequency in the input image, assigning a wide gray scale in the output image, thereby preventing the contrast from lowering.

In the gray scale conversion as described in Japanese Patent Laid-Open No. 2006-129105, an appropriate relationship between the D range of an input and the D range of an output is applied for each area obtained by division of the input image. In such gray scale conversion, if the dynamic range of the output is narrow, or brightness values are distributed widely and almost evenly, the contrast may be lowered by D range compression.

SUMMARY OF THE INVENTION

The present invention provides a technique of suppressing lowering of a contrast better in a technique of dividing an image into a plurality of areas and compressing the dynamic range of a brightness.

According to one aspect, the present invention provides an image processing apparatus for executing image processing of converting a first image having a first range of a brightness into a second image having a second range of the brightness narrower than the first range and outputting the second image, the apparatus comprising at least one processor, and at least one memory coupled to the at least one processor, wherein the at least one memory stores a computer program that causes, when executed by the at least one processor, the image processing apparatus to obtain information of a size of the first range and information of a size of the second range, to divide the first image based on the obtained information such that the number of areas obtained by dividing the first image in a case in which a ratio of the second range to the first range is a first value becomes less than the number in a case in which the ratio is a second value less than the first value, and to set, for each of the areas, relationship information that associates an input brightness value in the first range with an output brightness value in the second range, and converts a brightness value of a pixel included in the first image into a brightness value of a pixel of the second image based on the relationship information, and to output the second image obtained by the conversion.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 7A is a view for explaining an input brightness range;

FIG. 7B is a view for explaining an output brightness range;

DESCRIPTION OF THE EMBODIMENTS

An exemplary embodiment(s) of the present invention will now be described in detail with reference to the drawings. It should be noted that the relative arrangement of the components, the numerical expressions, and numerical values set forth in these embodiments do not limit the scope of the present invention unless it is specifically stated otherwise.

(Relationship between Dynamic Range Compression and Contrast Lowering)

The relationship between compression of a dynamic range (D range) performed by dividing an image into a plurality of areas and lowering of a contrast will be described first.

When performing D range compression based on the distribution of brightness values in each area of an input image, as in Japanese Patent Laid-Open No. 2006-129105, the greater the unevenness of the distribution of brightness values in an area is, the higher the probability that the contrast can be maintained at the time of D range compression becomes. This is because when, for an area in which brightness values in a certain range are dominant, gray scale conversion is performed such that the range of the gray scale in the output is made large for the range, lowering of the contrast can be prevented. In such gray scale conversion, brightness values outside the range are strongly compressed.

Figure 1:
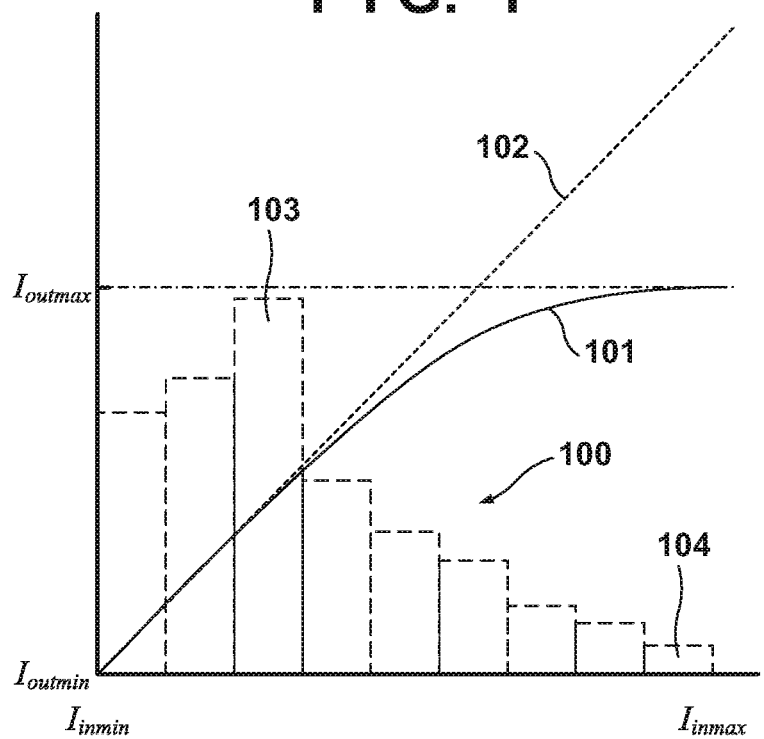
FIG. 1 is a view showing the histogram of an input brightness and the relationship between the input brightness and an output brightness.

As one example, such gray scale conversion is performed by histogram smoothing. An example in which gray scale conversion is performed by histogram smoothing will be described with reference to FIG. 1. FIG. 1 shows the histogram of brightness values in one area and a curve representing the relationship between the brightness values of an input image and the brightness values of an output image obtained from the histogram. A histogram 100 represents the distribution of brightness values in one area of an input image, and a curve 101 is a tone curve representing the relationship between the brightness values (abscissa) of the input image and the brightness values (ordinate) of an output image. Note that a straight line 102 represents the relationship between the brightness values of the input image and the brightness values of the output image in a case in which D range compression is not performed. The brightness values of the output image are brightness values under an observation environment. An output brightness range under an environment in which, for example, one image printed on a printing medium, such as paper, is illuminated with strong light is wider than the output brightness range of the image under, for example, a general illumination in a room environment.

In histogram smoothing, relationship information that associates an input brightness value and an output brightness value is decided in accordance with the appearance frequency of a certain brightness value in an area of interest. That is, conversion is performed such that a brightness range, whose appearance frequency in an input image is high, is associated with a relatively wide brightness range in an output image. It is, therefore, possible to compress the D range in the whole area while maintaining the contrast for an input brightness value of a higher appearance frequency. For example, in FIG. 1, conversion is performed such that a pixel having a brightness near a brightness value 103 of a high appearance frequency can maintain the contrast as compared to a pixel having a brightness near a brightness value 104 of a low appearance frequency.

Figure 2:
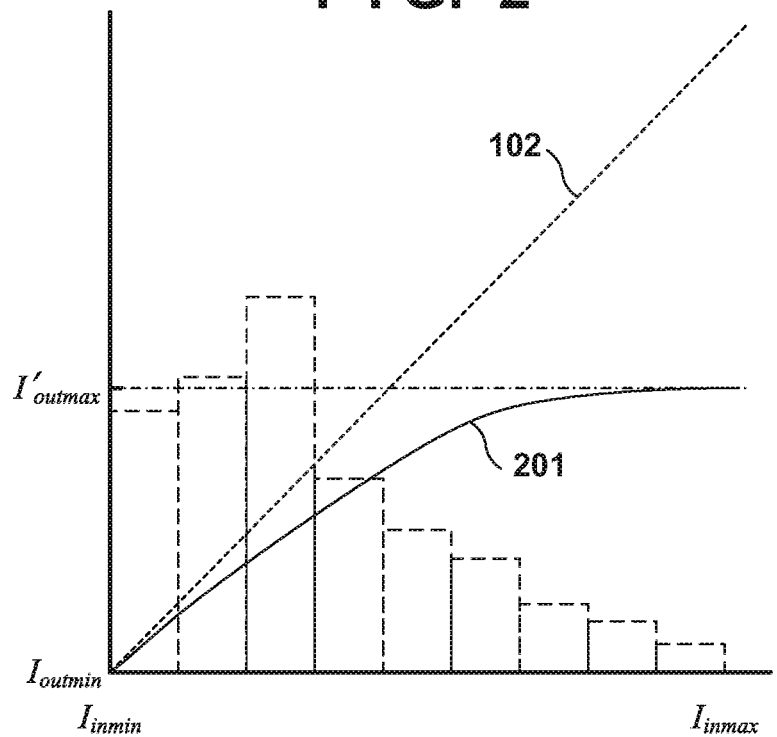
FIG. 2 is a view showing the histogram of an input brightness and the relationship between the input brightness and an output brightness.

On the other hand, the ease of contrast maintaining at the time of D range compression depends on the D range of the input image and the D range of the output image. That is, if the input image is the same, but the D range of the output changes because of a change of printing paper, or the like, the ease of contrast maintaining changes. For example, as shown in FIG. 2, a case in which the output D range is narrower ($I_{outmin}$ to $I'_{outmax}$, where $I'_{outmax} < I_{outmax}$) than the output D range ($I_{outmin}$ to $I_{outmax}$) shown in FIG. 1 will be examined. In this case, since the D range of the input is the same, but the D range of the output is narrower, the tone curve obtained by performing histogram smoothing is represented by a curve 201. In some cases, it is difficult to maintain the contrast, as compared to the case shown in FIG. 1.

For this reason, in this embodiment, to perform D range compression while maintaining the contrast, area division is performed such that the distribution of brightness values in an area becomes more uneven. Examples of a system that executes such processing and the arrangements and processing procedures of apparatuses in the system will be described below.

(System Arrangement)

Figure 3:
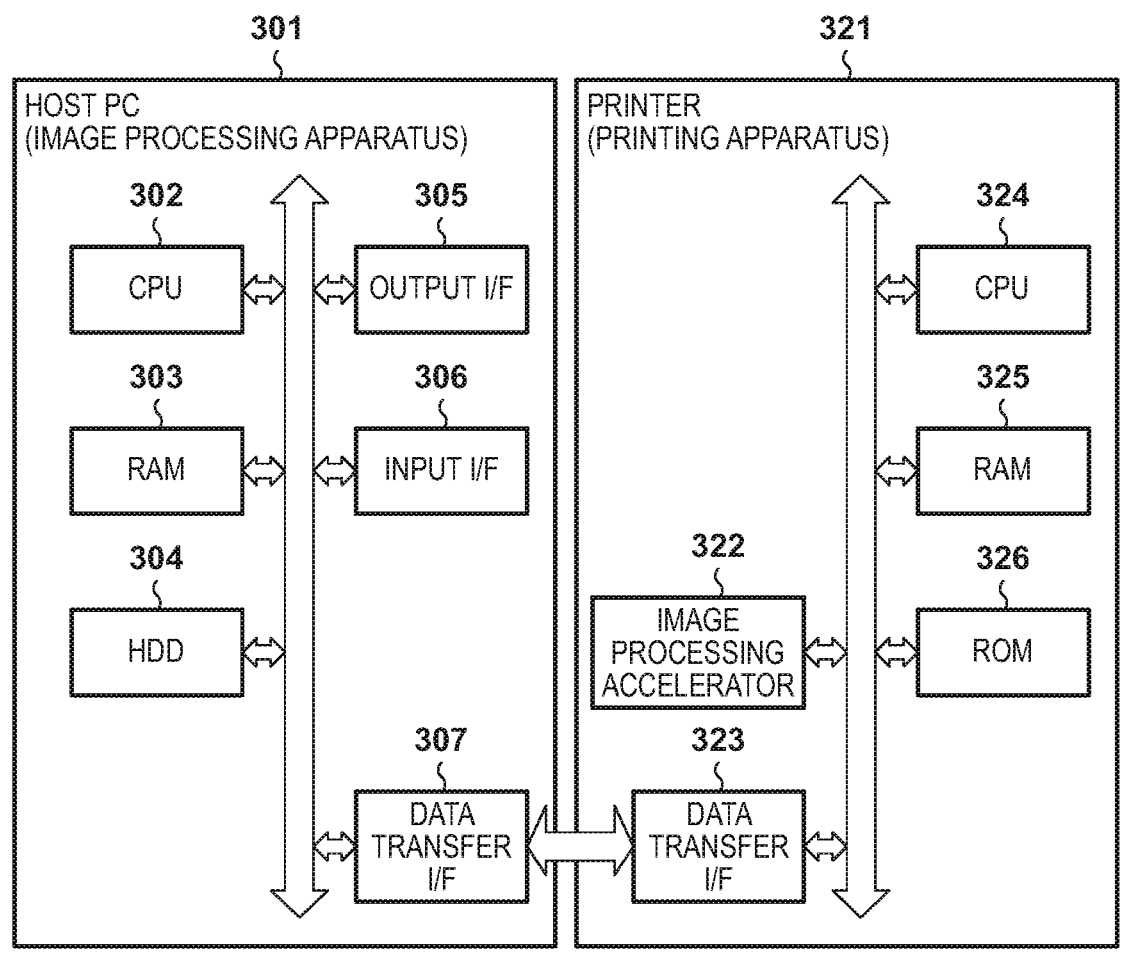
FIG. 3 is a block diagram showing an example of the arrangement of an image processing system.

FIG. 3 shows an example of the arrangement of an image processing system according to this embodiment. This system includes, for example, an image processing apparatus 301 and a printing apparatus 321. Note that this arrangement is merely an example, and an apparatus other than these may be included. Additionally, a plurality of apparatuses shown in FIG. 3 may be integrated into one apparatus by, for example, incorporating the image processing apparatus 301 in the printing apparatus 321. Furthermore, a block included in each apparatus shown in FIG. 3 may include another block. Alternatively, each block of each apparatus may be divided into a plurality of blocks, or one block including a plurality of blocks may be used.

The image processing apparatus 301 is, for example, a host PC (Personal Computer), but may be an electronic device other than this. The image processing apparatus 301 includes a CPU 302, a RAM 303, an HDD 304, an output I/F 305, an input I/F 306, a data transfer I/F 307, and the like. Note that "I/F" is a short for "interface". In addition, CPU is an acronym for Central Processing Unit, RAM is an acronym for Random Access Memory, and HDD is an acronym for Hard Disk Drive.

The CPU 302 executes various kinds of processing including the overall processing of the image processing apparatus 301 and predetermined image processing using the RAM 303 as a work area in accordance with a program held by the HDD 304. The CPU 302 is an example of a processor, and a processor other than this may be used. For example, another processor such as an MPU (Micro Processing Unit), a GPU (Graphics Processing Unit), or a DSP (Digital Signal Processor) may additionally or alternatively be used. In addition, processing executed by the CPU 302 may partially or wholly be executed by hardware capable of executing the processing such as an ASIC (Application Specific Integrated Circuit) or an FPGA (Field Programmable Gate Array). The RAM 303 is a memory used to storage temporary information. The RAM 303 at least operates to provide the work area when the CPU 302 executes processing, as described above. The HDD 304 is a storage device configured to continuously store information such as a program. Note that a ROM (Read Only Memory), or the like, may be used in place of or in addition to the HDD 304. The output I/F 305 is an interface configured to output data held by the image processing apparatus 301 (for example, after predetermined processing is executed) to an information output apparatus such as a display or speaker on the outside (or an information output apparatus (not shown) provided in the image processing apparatus 301). The input I/F 306 is an interface configured to accept information input from a device such as a keyboard, a pointing device, or a touch panel on the outside (or a device (not shown) provided in the image processing apparatus 301), which accepts a user operation and output information representing the user operation. The data transfer I/F 307 is an interface configured to perform communication with another device, and is, for example, a communication interface including a communication circuit of a wired LAN or a wireless LAN. Note that the data transfer I/F 307 may operate in accordance with the USB (Universal Serial Bus) standard or the IEEE (Institute of Electrical and Electronics Engineers) 1394 standard.

For example, the CPU 302 executes processing of generating image data printable by the printing apparatus 321 in accordance with a command input by the user via the input I/F 306 or a program held by the HDD 304. The CPU 302 executes control to transfer the generated image data to the printing apparatus 321 via the data transfer I/F 307. In addition, the CPU 302 can receive image data from an external apparatus such as the printing apparatus 321 or an image capturing apparatus (not shown) via the data transfer I/F 307, and perform predetermined processing for the image data in accordance with a program stored in the HDD. The CPU 302 executes control to display an image or various kinds of information obtained as the result of the predetermined processing on a display (not shown) via, for example, the output I/F 305.

The printing apparatus 321 is, for example, a printer such as an inkjet printer, but may be a printer of another type such as an electrophotographic printer. In place of the printing apparatus 321, another apparatus configured to output an image after compression of the dynamic range of a brightness to, for example, a screen may be used. The printing apparatus 321 includes, for example, an image processing accelerator 322, a data transfer I/F 323, a CPU 324, a RAM 325, and a ROM 326. In the printing apparatus 321, the CPU 324 executes control of the entire printing apparatus 321 or processing of executing various kinds of other processing in accordance with a program stored in the ROM 326 using the RAM 325 as a work space. Note that the printing apparatus 321 is configured to perform high-speed image processing using the image processing accelerator 322. Note that the image processing accelerator 322 is hardware capable of executing image processing at a speed higher than that in the CPU 324. The image processing accelerator 322 is activated when, for example, the CPU 324 writes parameters and data necessary for image processing at a predetermined address of the RAM 325. After the loading of the parameters and the data, the image processing accelerator 322 executes predetermined image processing for the data. Note that the image processing accelerator 322 is configured to alternatively execute processing executable by the CPU 324. In other words, if the CPU 324 has a sufficient processing capability, the printing apparatus 321 may not include the image processing accelerator 322.

(Procedure of Processing)

An example of the procedure of processing executed by the image processing system will be described next. Note that the following processing can be executed by, for example, at least one of the CPU 302 of the image processing apparatus 301 and the CPU 324 of the printing apparatus 321. That is, the processing to be described below may be executed by only one of the image processing apparatus 301 and the printing apparatus 321, or the image processing apparatus 301 and the printing apparatus 321 may share and partially execute the following processing. In addition, the following processing may be implemented not by executing a program by the CPU 302 or the CPU 324, but by dedicated hardware.

Figure 4:
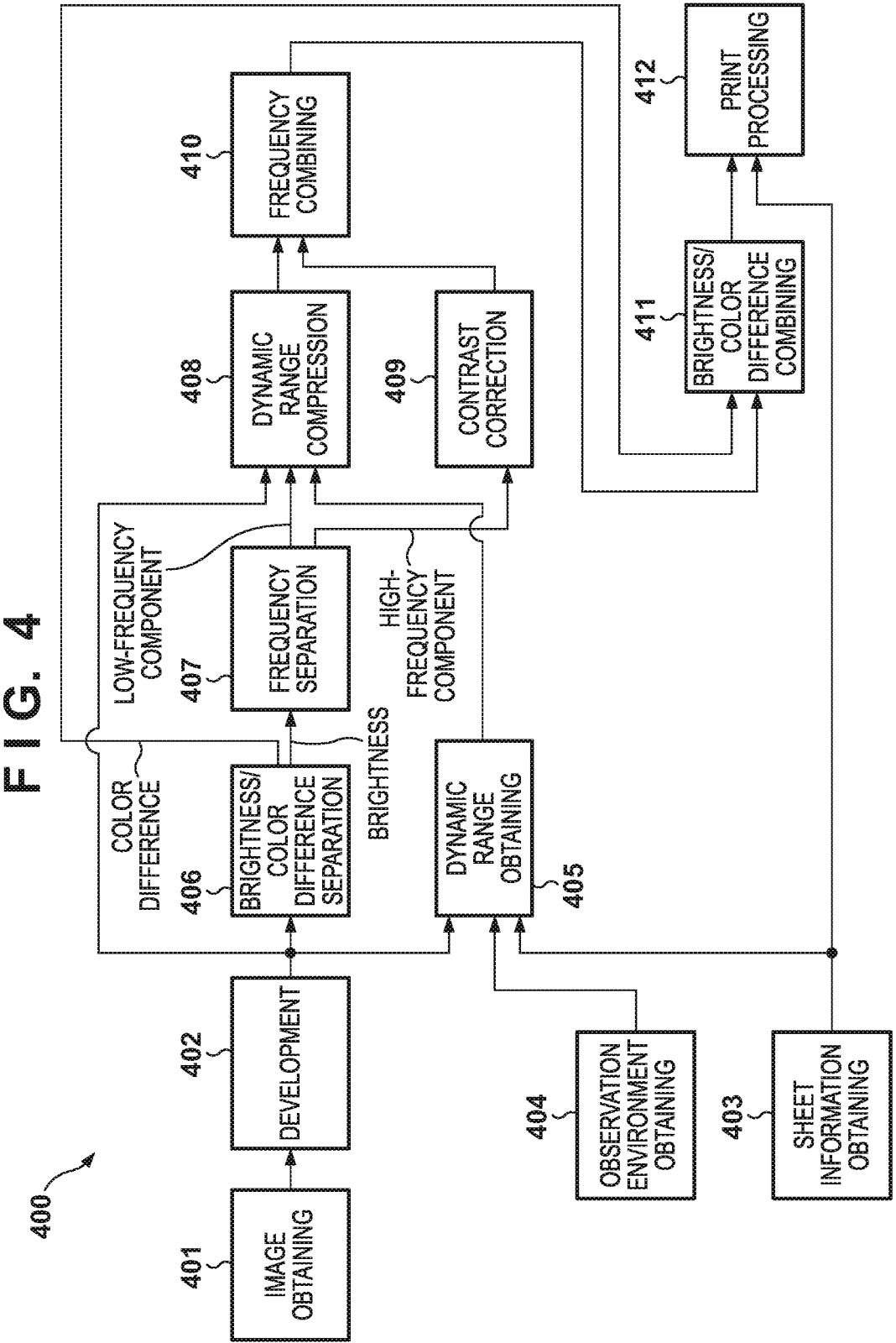
FIG. 4 is a block diagram showing the outline of processing until an image is printed.

An example of the procedure of processing 400 until data captured by an image capturing apparatus (not shown) is printed by the printing apparatus 321 will schematically be described next with reference to FIG. 4. FIG. 4 shows each of a plurality of partial processes included in the processing 400 as a functional block. Note that each functional block may be divided into two or more functional blocks, or a plurality of functional blocks may be integrated into one functional block. In addition, a functional block that is not illustrated in FIG. 4 may further be included. The processing can be implemented when, for example, the CPU 302 (or the CPU 324) executes a program saved in the HDD 304 (or the ROM 326) in cooperation with the RAM 303 (or the RAM 325). Note that the processing 400 may be implemented by one application, or may be implemented by a plurality of applications in accordance with the application purpose of the user or the function. Additionally, the image processing apparatus 301 or the printing apparatus 321 may execute the whole of the processing 400, or at least part of the processing 400 may be executed by another apparatus (for example, an image capturing apparatus).

In this processing, first, an image obtaining unit 401 obtains an image that an image capturing apparatus has obtained by a sensor. A development unit 402 converts the image obtained by the image obtaining unit 401 into a predetermined format by processing to be described later. Calculation of the dynamic range of the brightness of the image data is also performed here, and a value representing the calculated dynamic range is input to a dynamic range obtaining unit 405. The information of a sheet to perform printing, which is obtained by a sheet information obtaining unit 403, and the information of an environment (observation condition) to observe a printed product, which is obtained by an observation environment obtaining unit 404, are also input to the dynamic range obtaining unit 405 in addition to the value representing the dynamic range. In one example, the dynamic range obtaining unit 405 can specify the range of the dynamic range of the brightness in the output based on the information of the sheet and the information of the observation environment. The dynamic range obtaining unit 405 obtains the dynamic range of the brightness for each of the thus obtained input and output, and outputs the information to a dynamic range compression unit 408.

A brightness/color difference separation unit 406 separates the developed image data into a brightness component (brightness image) and color difference components (color difference image), inputs the brightness image data after the separation to a frequency separation unit 407, and inputs the color difference image data to a brightness/color difference combining unit 411. The frequency separation unit 407 specifies the spatial frequency of the brightness image, and separates the image into a high-frequency component and a low-frequency component based on the specified spatial frequency. The frequency separation unit 407 outputs the low-frequency component after the separation to the dynamic range compression unit 408, and outputs the high-frequency component to a contrast correction unit 409. The dynamic range compression unit 408 executes processing of compressing the dynamic range of the brightness using the image data from the development unit 402 based on the value within the range of the dynamic range of the brightness obtained by the dynamic range obtaining unit 405. The contrast correction unit 409 executes contrast correction for the input high-frequency component.

After the processing for each frequency component, a frequency combining unit 410 combines the data of the high-frequency component and the data of the low-frequency component, and obtains brightness image data after the processing. The brightness/color difference combining unit 411 combines the brightness image data after the processing and the color difference image data, thereby generating output image data. A print processing unit 412 executes processing for printing for the output image data, and transmits the data after the processing to the printing apparatus 321.

The procedure of the processing by the functional arrangement shown in FIG. 4 will be described with reference to FIG. 5. In the processing shown in FIG. 5, first, the image obtaining unit 401 obtains captured image data (step S501). The image data obtained here is not general-purpose data in the JPEG format, or the like, which has undergone predetermined processing, but so-called RAW data obtained by image capturing. After that, the development unit 402 executes development processing for the image data (step S502). This development processing will be described with reference to FIG. 6.

In the development processing, the development unit 402 first executes color interpolation processing by debayer processing or mosaic processing for each of the pixels in the RAW data formed by single-color signals (step S601). By this processing, the RAW data is converted into R, G, and B image signal values. After that, the development unit 402 executes white balance processing in accordance with preset development settings (step S602). In the white balance processing, R, G, and B signal values are multiplied by set coefficients. Then, the development unit 402 executes gamma processing in consideration of the development settings and the characteristic of a display device (step S603). The development unit 402 executes noise removal and sharpness processing by filter processing as needed based on user settings and image capturing conditions (steps S604 and S605). The development unit 402 then executes color conversion processing (step S606). In the color conversion processing, conversion to a predetermined defined color space, adjustment of the hue, and suppression processing of color bending in a high brightness area are applied. With the above-described development processing, R, G, and B images each having a desired gamma value are generated.

Referring back to FIG. 5, the dynamic range obtaining unit 405 obtains the brightness data of the bright and dark portions of the input image (step S503). The brightness data of the bright portion is specified based on a value calculated from camera information included in the obtained image data and values calculated from the settings at the time of image capturing and a value extended by the development processing in step S502. The value extension can be executed by, for example, white balance processing in step S602 of FIG. 6. At the time of white balance processing, substitution processing according to the saturation level and pixel information is executed, thereby extending the gray scale of the high brightness area (N stages: N≥1). Japanese Patent Laid-Open No. 2015-156615 describes such extension processing of the gray scale of a high brightness area.

FIG. 7A shows a table of brightness values of a bright portion corresponding to the combinations of camera information and settings at the time of image capturing. In this table, different pieces of model information (in this example, three models "A", "B", and "C") of cameras are shown in the vertical direction, and the modes (image capturing settings) of the cameras are shown in the horizontal direction. Here, as the modes of the cameras, a normal mode and a high brightness obtaining mode in which image capturing is performed under an exposure condition darker by one step in the settings of the cameras are shown. Note that the table of FIG. 7A is merely an example, and image capturing settings other than these may be defined. A value "R" shown in the table is the brightness value (unit: %, a relative value in a case in which the measured brightness is 18%) of a high brightness portion. Based on the value R and the information representing that extension of N stages is possible, which is obtained by the development processing in step S502, a brightness value Yi(W) of the bright portion of the final input image is calculated by $$Yi(W) = R \times 2^N$$

On the other hand, a dark portion brightness Yi(D) of the input image is a value for which the absence of entering of light is assumed. Hence, Yi(D)=0 holds independently of the settings.

In addition, the dynamic range obtaining unit 405 obtains the brightness data of the bright and dark portions on the output side (step S504). FIG. 7B shows a table of brightness values for each sheet to output (print) an image. In this table, paper types are shown in the vertical direction, and black portions Yo(D) and paper white portions Yo(W) are shown in the horizontal direction. Each value shown in the table is a brightness value [cd/m2], and has a value (white serving as a reference=100 [cd/m2]) obtained under a predetermined general illumination environment. A value converted in consideration of the visual characteristic may be used as this value.

Next, the brightness/color difference separation unit 406 separates each of the R, G, and B signal values into the information of a brightness (Y) and the information of color differences (CbCr) (step S505). This separation is performed for each pixel by conversion using $$Y = 0.299 \times R + 0.587 \times G + 0.114 \times B$$

$$Cb = -0.16874 \times R - 0.33126 \times G + 0.5 \times B$$

$$Cr = 0.5 \times R - 0.41869 \times G - 0.081 \times B$$

The frequency separation unit 407 separates the brightness value image separated in step S505 into a low-frequency component image and a high-frequency component image (step S506). To generate, for example, the low-frequency component image, the frequency separation unit 407 applies a low-pass filter to the input brightness value image. In this processing, for example, a spatial filter may be applied to the brightness value image. Alternatively, the brightness value image may be converted into a spatial frequency image by FFT, filter processing may be executed for the spatial frequency image, and after that, the image may be returned to the brightness value image by IFFT. Note that FFT is short for fast Fourier transformation, and IFFT is short for inverse fast Fourier transformation. Here, a frequency as a passband can be decided based on the sheet size or the observation distance when appreciating a printed product and in consideration of the visual characteristic of a human. On the other hand, to generate the high-frequency component image, the frequency separation unit 407 may apply a high-pass filter to the brightness value image, or the low-frequency component image obtained in the above-described way may be subtracted from the original image.

The dynamic range compression unit 408 executes dynamic range compression processing for the low-frequency component image obtained in step S506 based on the information of the bright and dark portions of the input and the output obtained in steps S503 and S504 (step S507). Details of this processing will be described later.

The contrast correction unit 409 performs contrast correction processing for the high-frequency component image obtained in step S506 (step S508). In this processing, the input high-frequency component image is multiplied by a coefficient k. In a case in which an expression close to the scene at the time of image capturing is requested, k=1±Δ (Δ is 0 or a sufficiently small predetermined value) is set. In a case in which degradation such as bleeding of ink of a printed product is taken into consideration, k is set to a higher value.

The frequency combining unit 410 combines the low-frequency component image that has undergone the dynamic range compression in step S507 and the contrast-corrected high-frequency component image, thereby obtaining a brightness value image compressed to a predetermined dynamic range and also contrast-corrected (step S509). After that, the brightness/color difference combining unit 411 combines the color difference components with the brightness value image obtained in step S509 (step S510), and converts the values into R, G, and B signals using $$R = Y + 1.402 \times Cr$$

$$G = Y - 0.34414 \times Cb - 0.71417 \times Cr$$

$$B = Y + 1.772 \times Cb$$

Then, the print processing unit 412 performs image processing for printing for the obtained R, G, and B signal values and outputs them (step S511).

Figure 8:
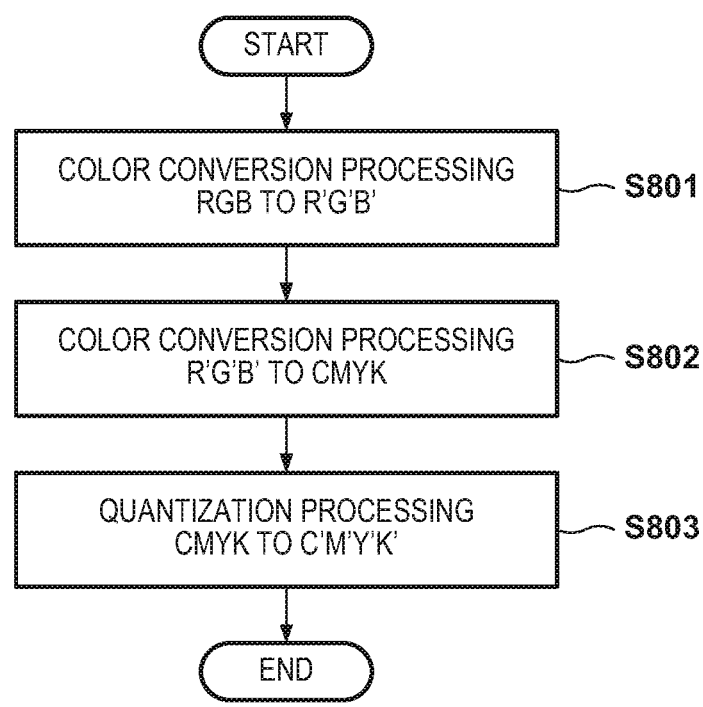
FIG. 8 is a flowchart showing an example of the procedure of print processing.

The procedure of print processing will be described next with reference to FIG. 8. First, the print processing unit 412 executes color conversion processing (step S801). Accordingly, the R, G, and B values of each pixel of the image obtained in step S510 are converted into R', G', and B' values suitable for the color of the sheet set by the user in advance. This conversion can be executed by various methods. In general, a lookup table in which a value to be converted is defined in correspondence with a discrete lattice point is used. Then, the print processing unit 412 converts the R', G', and B' values obtained by the conversion into ink colors to be actually used in printing (step S802). In this processing as well, conversion based on, for example, a lookup table optimized for each set sheet is performed. Note that, in the example shown in FIG. 8, a case in which C, M, Y, and K (C: cyan ink, M: magenta ink, Y: yellow ink, and K: black ink) are used will be described. However, the present invention is not limited to this. That is, in step S802, conversion processing according to the number of inks to be used in printing is performed. After that, the print processing unit 412 converts the values converted in step S802 into the number of gray scale tones that the printing apparatus 321 can receive to execute printing (step S803). This conversion is performed by, for example, error diffusion processing or dither processing. In one example, for photo printing, error diffusion processing or processing using a dither matrix with a blue noise characteristic is executed. The data converted into the number of gray scale tones is transferred to the printer, thereby executing printing. Note that the described processes are merely examples, and a case in which an ICC (International Color Consortium) profile is used also applies to this.

Figure 5:
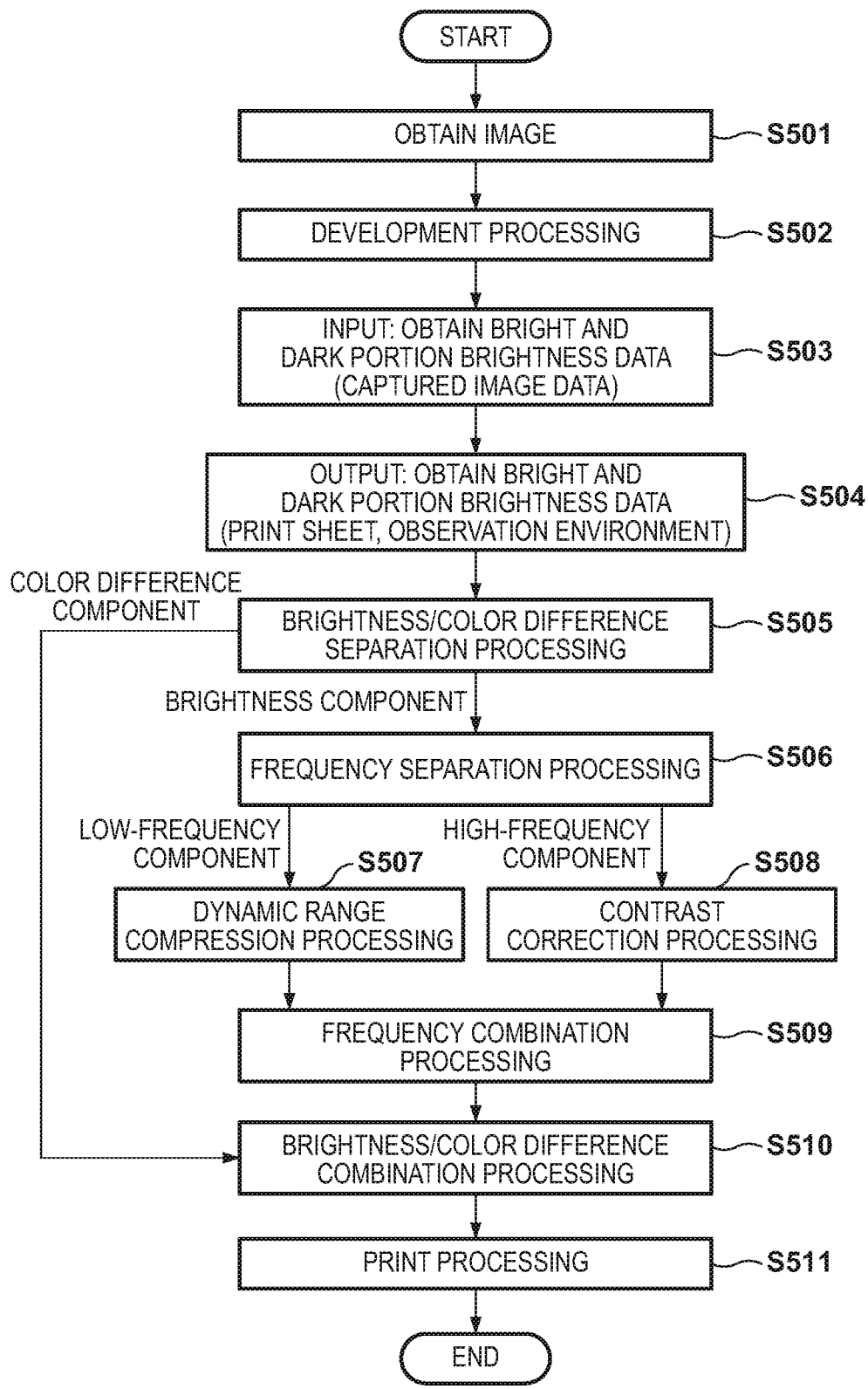
FIG. 5 is a flowchart showing an example of the procedure of processing until an image is printed.
Figure 6:
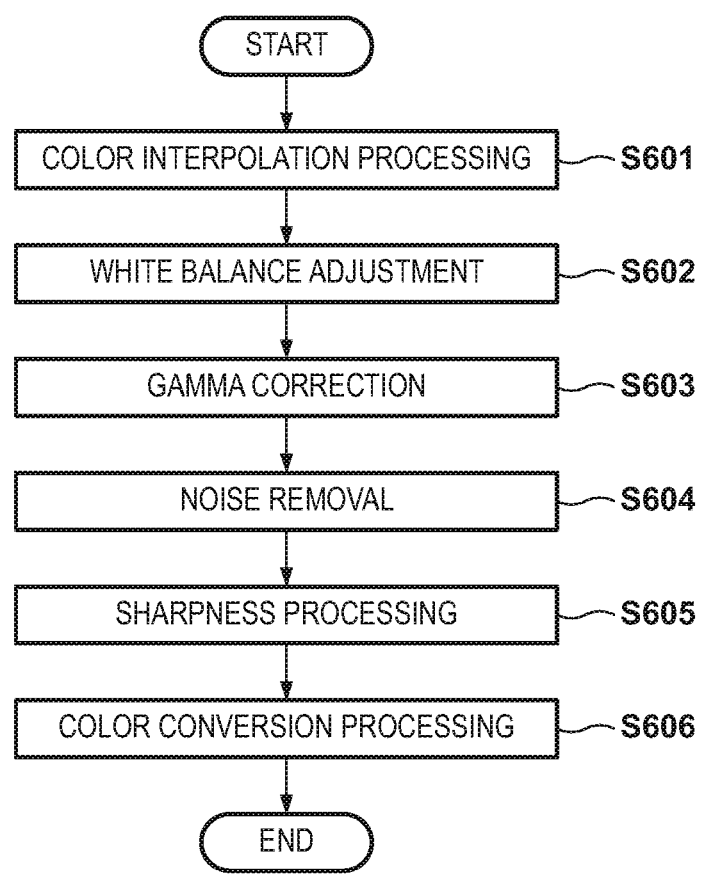
FIG. 6 is a flowchart showing an example of the procedure of development processing.

When processing from development of an obtained image to printing is executed by the processing as shown in FIG. 5, processing considering the paper type and the observation environment is executed for the dynamic range of the image of the printing target. With this processing, it is possible to implement a printed product in which the influence of image quality degradation caused by D range compression is suppressed.

Note that, in the above-described processing example, processing performed in a case in which the printing apparatus 321 prints an image has been described. However, the present invention is not limited to this. For example, each processing to be described in this embodiment can be applied in an arbitrary system configured to output an image in a brightness range narrower than the brightness range of an input image for display by a display device with a narrow brightness expression enable range.

(Dynamic Range Compression Processing of Brightness)

Several examples of the procedure of dynamic range (D range) compression processing of a brightness executed in step S507 described above will be described below.

Processing Example 1

Figure 9A:
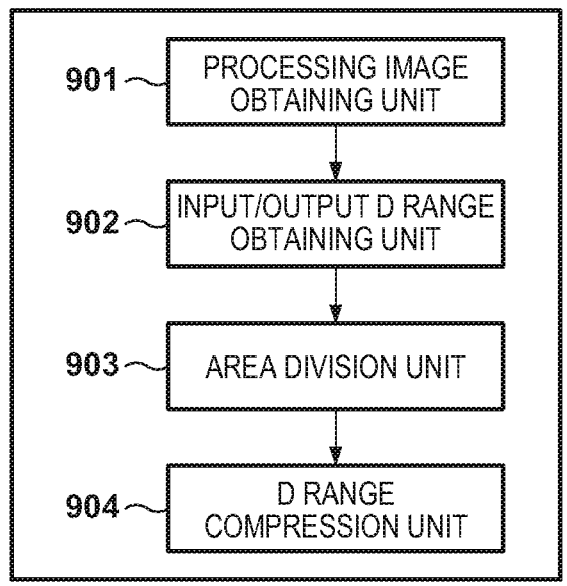
FIG. 9A is a block diagram showing an example of a functional arrangement configured to execute dynamic range compression processing.

A first processing example will be described with reference to FIGS. 9A to 9C. FIG. 9A shows an example of a functional arrangement configured to execute processing shown in FIGS. 9B and 9C, which is implemented when, for example, the CPU 302 of the image processing apparatus 301 and the CPU 324 of the printing apparatus 321 execute programs. This functional arrangement includes, for example, a processing image obtaining unit 901, an input/output D range obtaining unit 902, an area division unit 903, and a D range compression unit 904. The processing image obtaining unit 901 obtains an image of a processing target from the above-described image obtaining unit 401. The input/output D range obtaining unit 902 obtains the information of the D range of the image of the processing target and the D range of an image (an image to be obtained by printing by the printing apparatus 321 or an image to be displayed on a display, or the like) to be output, which are obtained by the above-described dynamic range obtaining unit 405. The area division unit 903 divides the input image into a plurality of areas. The D range compression unit 904 performs D range compression for each of the plurality of areas obtained by the division of the input image (hereafter, each area obtained by the division is referred to as a "divided area").

Figure 9B:
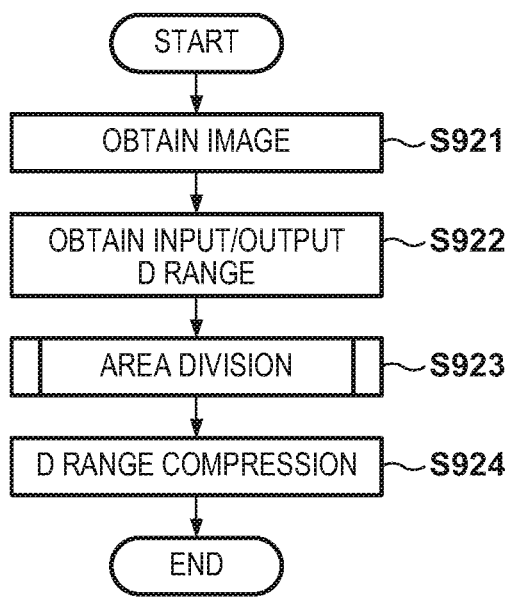
FIG. 9B is a flowchart showing an example of the procedure of dynamic range compression processing.
Figure 9C:
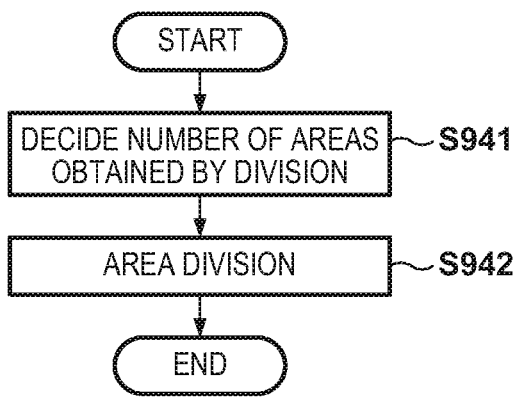
FIG. 9C is a flowchart showing an example of the procedure of area division processing.

In the processing shown in FIG. 9B, first, the processing image obtaining unit 901 obtains an input image (step S921), and the input/output D range obtaining unit 902 obtains the information of the input D range and the output D range (step S922). Note that the information of the input D range may be obtained by analyzing the input image, or a value determined in advance may be obtained as the information of the input D range. The information of the input D range may be obtained by a method other than these. In addition, a D range corresponding to an output medium, such as an image to be obtained by printing by the printing apparatus 321 or an image to be displayed on a display, or the like, is obtained as the information of the output D range. Then, the area division unit 903 divides the input image into areas (step S923), and the D range compression unit 904 performs D range compression for each area (step S924). Area division in step S923 will be described later. D range compression for each area can be performed by a method of performing gray scale conversion in accordance with the distribution of brightness values in each area, as described in Japanese Patent Laid-Open No. 2006-129105. However, the method is not limited to this. That is, any other method may be used as long as the relationship information between an input D range and an output D range for each area is set in accordance with the distribution of brightness values in an area, and D range compression is performed based on the set information. Note that the relationship information here may be, for example, a lookup table, or the like, or may be a function using an input brightness value as an argument. That is, arbitrary information defining conversion that changes a brightness value to be output for an input brightness value for an area in which the distribution of brightness values is greatly different can be used as the relationship information.

Area division in step S923 will be described next with reference to FIG. 9C. First, the area division unit 903 decides the number of divided areas based on the input D range and the output D range (step S941). The lesser the ratio of the output D range to the input D range is, the higher the probability that the contrast cannot be maintained at the time of D range compression becomes. The greater the ratio of the output D range to the input D range is, the higher the probability that the contrast can be maintained at the time of D range compression becomes. On the other hand, the smaller the size of an area is, the more easily the distribution of brightness values in the area becomes uneven. It is, therefore, possible to improve the probability that the contrast can be maintained. For this reason, to maintain the contrast, the number of divided areas can be decided such that the number of divided areas becomes great (the size of an area becomes small) as the D range compression ratio becomes high. That is, the number of areas obtained by dividing the input image in a case in which the ratio of the second range of the output image to the first range of the input image is the first value is set to be less than the number of areas in a case in which the ratio is the second value smaller than the first value.

Here, the D range compression ratio is defined by $$\text{Compressibility} = 1 - \frac{D_{out}}{D_{in}}$$

Note that $D_{in}$ and $D_{out}$ are the sizes (widths) of the input D range and the output D range. These values are calculated by $$D_{in} = L_{inmax} - L_{inmin}$$

and $$D_{out} = L_{outmax} - L_{outmin}$$

where $L_{inmax}$ and $L_{inmin}$ are the maximum brightness value and the minimum brightness value of the input, respectively, and $L_{outmax}$ and $L_{outmin}$ are the maximum brightness value and the minimum brightness value of the output, respectively.

The area division unit 903 decides the number $N_{seg}$ of divided areas for the D range compression ratio as $$N_{seg} = N_{min} + (N_{max} - N_{min}) \cdot \text{Compressibility}$$

where $N_{min}$ and $N_{max}$ are the minimum value and the maximum value of the number of divided areas, respectively. These values are defined empirically. According to this calculation, as the ratio ($D_{out}/D_{in}$) of the input D range to the output D range becomes larger, the variable "Compressibility" approaches to 0, and the number $N_{seg}$ of divided areas approaches asymptotically to the minimum value $N_{min}$. On the other hand, as the ratio ($D_{out}/D_{in}$) of the input D range to the output D range becomes smaller (approaches to "0"), the variable "Compressibility" approaches to 1, and the number $N_{seg}$ of divided areas approaches asymptotically to the maximum value $N_{max}$. In this way, under a situation where D range compression needs to be more strongly performed, the number of divided areas can be made large by the above-described calculation in accordance with the ratio of the output D range to the input D range. Note that, in actual area division, for example, the number of areas after division can sometimes take only a discrete value. That is, for example, when an image is divided into n areas in the vertical direction, the number of areas can take only a multiple of n. Additionally, although the value of the above-described formula can be a non-integer, the number of divided areas needs to be an integer, as is apparent. For this reason, the actual number of divided areas can be set to, for example, a minimum possible number equal to or greater than the value of the result of the above-described calculation. Accordingly, for example, within a predetermined range of the ratio of the output D range to the input D range, the same number of divided areas is used. Note that, instead of using the above-described calculation, $N_{max}$ may be used as the number of divided areas in a case in which the ratio is a sufficiently small first predetermined value or less, and $N_{min}$ may be used as the number of divided areas in a case in which the ratio is a sufficiently large second predetermined value or more.

Note that the number of divided areas may be decided, not by the above-described calculation, but by another method. For example, the number of divided areas can be decided by referring to a lookup table (LUT) that is generated in advance and defines the correspondence relationship between the D range compression ratio (or the input D range and the output D range) and the number of divided areas. In this case, for example, an LUT in which $N_{max}$ is associated as the number of divided areas in a range in which the ratio of the output D range to the input D range is a first predetermined value or less, and $N_{min}$ is associated as the number of divided areas in a range in which the ratio is a second predetermined value or more can be used. Additionally, in this LUT, for values between the first predetermined value and the second predetermined value of the ratio of the output D range to the input D range, one or more ranges each having a predetermined width are defined. The values of the number of divided areas between $N_{min}$ and $N_{max}$ are associated for each range. At this time, the correspondence relationship can be defined such that the number of divided areas becomes small stepwise in a range in which the value of the ratio is large.

Next, the area division unit 903 performs area division in accordance with the number of divided areas decided in step S941. The area division can be performed by a conventional technique described in, for example, Achanta et al., "SLIC Superpixels Compared to State-of-the-Art Superpixel Methods", IEEE Transactions on Pattern Analysis and Machine Intelligence, 2012, or the like, and a description thereof will be omitted here. Note that the area division method is not particularly limited, and, for example, division to rectangular shapes may simply be performed.

As described above, in this processing example, the number of divided areas is increased as the ratio of the D range of the output to the D range of the input becomes small, thereby making the distribution of brightness values in an area after division more uneven. This makes it possible to assign a sufficient output brightness range to the range of brightness values dominant in the area and to compress the D range of a brightness value while suppressing lowering of the contrast.

Processing Example 2

In the second processing example, to appropriately decide the number of divided areas, a plurality of candidates of the number of divided areas are prepared, and an evaluation value representing whether contrast lowering can be suppressed when area division is performed by each of the plurality of candidates is calculated. Then, a candidate of a high evaluation value is decided as the number of divided areas used in actual D range compression processing. When the decided number of divided areas is used, contrast lowering by D range compression can sufficiently be suppressed.

Figure 10:
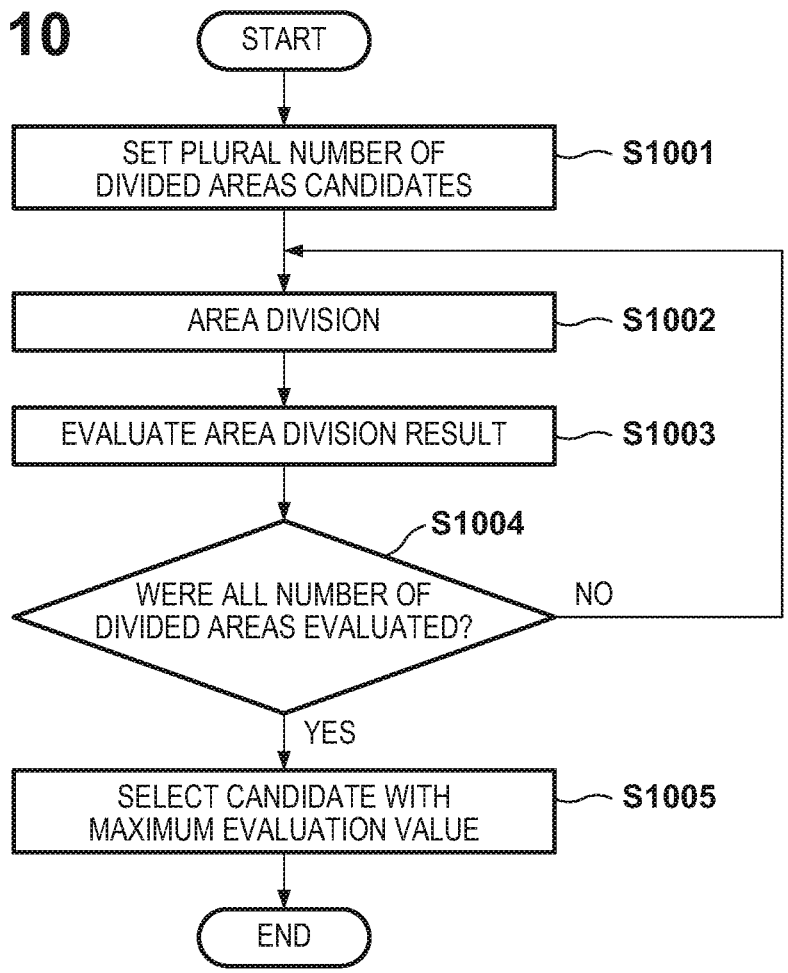
FIG. 10 is a flowchart showing an example of the procedure of area division processing.

This processing example will be described with reference to FIG. 10. Note that, in this processing example, a procedure except area division processing (step S923) is the same as in Processing Example 1, and a description thereof will be omitted. FIG. 10 shows the procedure of the processing of step S923 in this processing example.

First, the area division unit 903 sets a plurality of candidates of the number of divided areas (step S1001). These candidates are given as, for example, numbers empirically defined in advance. Alternatively, these candidates may be set by referring to a lookup table that defines the relationship between the input D range or the output D range and the candidates of the number of divided areas using the input D range or the output D range as an argument. Note that the candidates of the number of divided areas may be set by a method other than these.

The area division unit 903 executes area division of an input image using the number of divided areas given as one of the plurality of candidates set in step S1001 (step S1002). The area division method is the same as the area division method in step S942 of Processing Example 1. That is, in step S1002, area division of the input image is performed by the area division method when actually performing D range compression.

The area division unit 903 evaluates the result of area division in step S1002.

As described above, in general, when the size of an area obtained by area division is made smaller, the pixel distribution in an area becomes uneven, and the probability that D range compression can be performed while maintaining the contrast becomes high. However, when the areas are obtained by finely dividing the input image, the frequency band capable of maintaining the contrast becomes narrow. For this reason, when D range compression is performed for each area, the contrast in an area can be maintained, but it may be impossible to maintain the contrast between the areas. Hence, it is necessary to decrease the number of divided areas (increase the area size) within a range in which the D range can be compressed while maintaining the contrast. Hence, the evaluation value of the area division result is calculated using the unevenness of brightness values in an area and an area size in addition of the D ranges of an input and output in the following way.

$$\text{Score}(N_{seg}) = \frac{1}{N_{seg}} \sum_{n=1}^{N_{seg}} 1 - \exp\left(-w(D_{in}, D_{out}) \cdot \frac{A_n}{Stdv_n}\right)$$

for $$w(D_{in}, D_{out}) = \alpha \cdot \frac{D_{out}}{D_{in}}$$

Note that n represents an nth area, $A_n$ is the size of the nth area, $Stdv_n$ is the variance of brightness values in the nth area, $D_{in}$ and $D_{out}$ are the input D range and the output D range, respectively, and a is an empirically decided positive coefficient. According to the above-described equations, when the number of areas in which the size of an area is large, and for which the variance of brightness values in the area is small is large, an evaluation value $\text{Score}(N_{seg})$ approaches asymptotically to 1. When the size of an area is small, and the variance of brightness values is large in many areas, the evaluation value $\text{Score}(N_{seg})$ approaches to 0.

Note that the method of calculating the score for evaluating the area division result is not limited to the method using the above-described equations. For example, let $l''_{max}$ and $l''_{min}$ be the maximum value and the minimum value of brightness values in the nth area. At this time, a high evaluation value can be given when the number of divided areas is small on condition that an area division result that sets $(l''_{max}-l''_{min})$ within an allowable range with respect to the output D range. When this calculation is performed for all areas, the evaluation value for each candidate of the number of divided areas in the entire image can be calculated. In this case, for the number of divided areas for which $(l''_{max}-l''_{min})$ does not fall within the allowable range with respect to the output D range, the evaluation value concerning the area may be set to 0. In addition, candidates of the number of divided areas for which $(l''_{max}-l''_{min})$ falls within the allowable range with respect to the output D range may be extracted for all areas (for all n's), and the maximum evaluation value may be given to the minimum candidate of the number of divided areas in the candidates.

Finally, the area division unit 903 selects the candidate for which the evaluation value of the obtained area division result is highest as the number of divided areas used in actual D range compression (step S1005). Note that the area division unit 903 may decide the number of divided areas used in actual D range compression based on another standard, for example, by selecting the candidate with the smallest number of divided areas in candidates with evaluation values of a predetermined value or more.

As described above, in this processing example, area division results for a plurality of candidates of the number of divided areas are evaluated based on the input D range, the output D range, and the distribution of brightness values in each areas, and the number of divided areas used in actual D range compression processing is decided based on the evaluation value. This can sufficiently suppress lowering of the contrast at the time of D range compression.

Processing Example 3

In the third processing example, the size of an area after division (and the number of areas after division) are decided based on the sizes of the D ranges of an input and output and an observation condition in consideration of the contrast sensitivity of a human eye. This makes it possible to sufficiently suppress contrast lowering caused by D range compression in consideration of the characteristic of a human eye and the observation condition.

Figure 11:
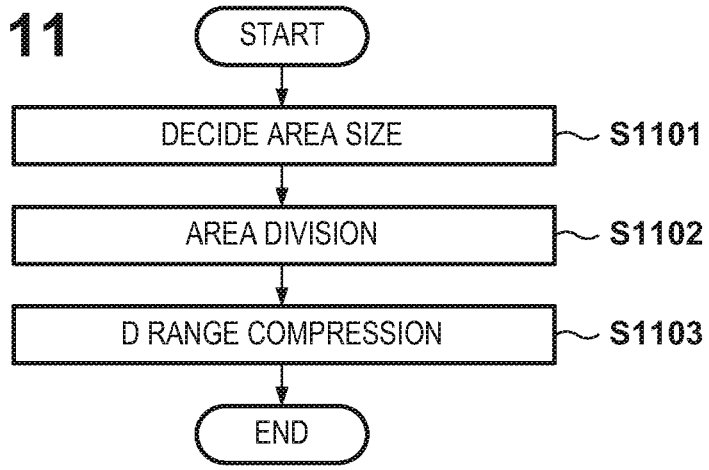
FIG. 11 is a flowchart showing an example of the procedure of area division processing.

This processing example will be described with reference to FIG. 11. Note that, in this processing example, a procedure except area division processing (step S923) is the same as in Processing Example 1, and a description thereof will be omitted. FIG. 11 shows the procedure of the processing of step S923 in this processing example. In this processing example, the area division unit 903 first decides the area size after division (step S1101). The decision of the area size is performed based on the D ranges of an input and an output, and an observation environment obtained by the observation environment obtaining unit 404. The observation environment is information representing an environment when the user observes an output object output from the printing apparatus 321. The observation environment information includes an observation distance when observing the output object, the size of the output object, and the information of the brightness at the time of observation. The observation environment obtaining unit 404 obtains the observation environment information based on, for example, user operation information obtained, via the input I/F 306, from the user who operates the host PC. Alternatively, the observation environment obtaining unit 404 may obtain the observation environment information set in advance and saved in the HDD 304 by reading it out from the HDD 304.

As described above, in D range compression processing with area division, it may be necessary to decrease the number of divided areas (increase the area size) within a range capable of compressing the D ranges while maintaining the contrast. However, in a case in which high-brightness pixels and low-brightness pixels coexist in many portions of an image, it is not easy to obtain such area division. In addition, generally, a tradeoff relationship holds between a degree representing whether the contrast in an area can be maintained and the width of a frequency band capable of maintaining the contrast. Hence, in this processing example, the number of divided areas (the size of an area) is decided using a visual characteristic.

Figure 12:
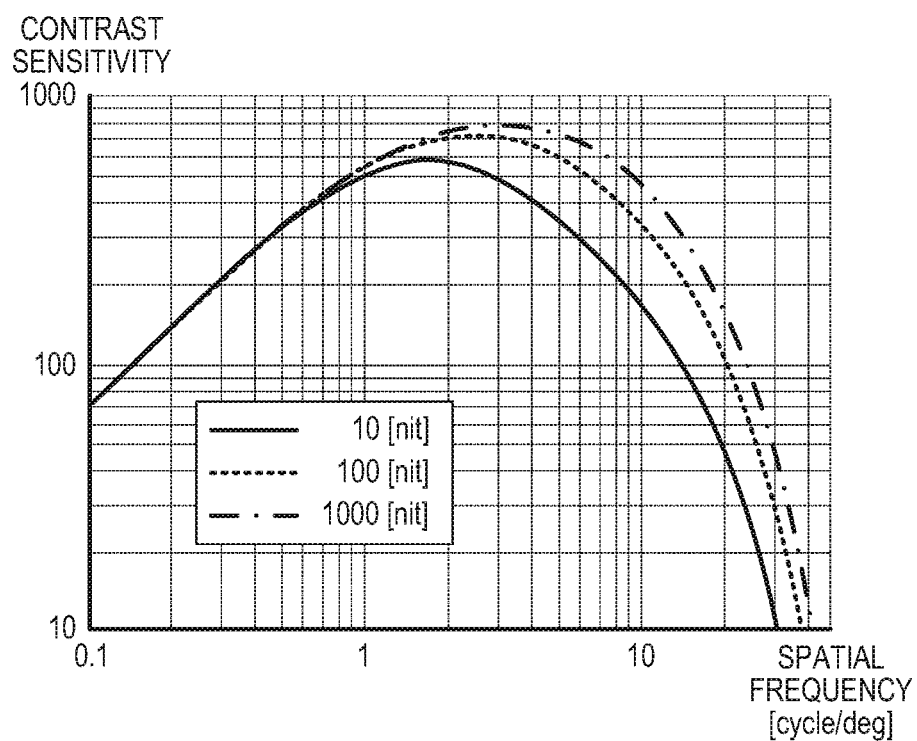
FIG. 12 is a view showing the relationship between a spatial frequency and a contrast sensitivity.

As a model of a contrast sensitivity viewed by a human, a Barten model is known. FIG. 12 shows the relationship of the contrast sensitivity of the Barten model to the spatial frequency u in a case in which the target brightness is set to 10 [nit], 100 [nit], and 1,000 [nit]. As shown in FIG. 12, as the target brightness L becomes high, the frequency of the high contrast sensitivity transitions to a high frequency side. To the contrary, as the target brightness L becomes low, the frequency of the high contrast sensitivity transitions to a low frequency side, as is apparent. When the contrast of the frequency band of the high sensitivity lowers due to D range compression, lowering of the contrast is assumed to be more noticeable than in the frequency band of the low sensitivity.

Hence, in this processing example, settings are done such that at least the peak of the contrast sensitivity is included in the frequency band to be maintained in D range compression.

Assuming that the shape of an area obtained after division is a square whose sides each have a size W, a calculation method of W will be described below.

Let S [cycles/deg] be the spatial frequency. The size W of one side of an area corresponding to the spatial frequency is given by $$W = \frac{P}{2S}$$

Note that, letting d [mm] be the distance to observe the output object, and r [dpi] be the resolution of the output object, pixels per degree P [pixel/deg] is represented by $$P = 1 / \frac{180}{\pi} \tan^{-1}\left(\frac{\left(\frac{25.4}{r}\right)}{d}\right)$$

Hence, letting Speak be the peak frequency of the contrast sensitivity, and $W_{peak}$ be the window size at the frequency, when W that satisfies $$W \geq W_{peak}$$

is selected, the contrast of the frequency band including the peak of the contrast sensitivity can easily be maintained. Hence, in step S1101, the area size W is decided by, for example, $$W = W_{peak} + \frac{(W_{max} - W_{peak})D_{out}}{D_{in}}$$

Note that $W_{max}$ is the maximum size of the area, and this size is defined empirically. In this way, the size of an area after division (and the number of areas after division) are decided.

Next, the area division unit 903 divides the input image in accordance with the area size decided in step S1101 (step S1102) and D range compression is executed for each area after division (step S1103). D range compression for each area can be performed by a method of performing gray scale conversion in accordance with the distribution of brightness values in each area, as described in Japanese Patent Laid-Open No. 2006-129105. However, the method is not limited to this. That is, any other method may be used as long as the relationship information between an input D range and an output D range for each area is set in accordance with the distribution of brightness values in an area, and D range compression is performed based on the set information.

Note that, in this processing example, dividing an image into square areas has been described. However, the present invention is not limited to this. That is, the shape need be neither a square nor a rectangle as long as the frequency band including the peak of the contrast sensitivity can be recovered by the area division method.

As described above, when the observation condition of the output image is taken into consideration in addition to the input D range and the output D range, the contrast of a spatial frequency band of a high contrast sensitivity viewed by a human can be maintained at the time of D range compression.

As described above, in this embodiment, the number of areas obtained by dividing an input image is set based on at least the size of the range of the brightness values of the input image and the size of the range of the brightness values of the output image. For example, when the ratio of the range of the brightness values of the output image to the range of the brightness values of the input image is small, area division is finely performed, and D range compression is performed in a narrow area. In a case in which the area division is finely performed, the variance of the distribution of brightness values in the area becomes small (that is, some brightness values are dominant), and the contrast can be maintained even if D range compression is performed in the area. It is also possible to prepare a plurality of candidates of the number of areas after division, to specify, based on the size of the range of the brightness values of the input image and the size of the range of the brightness values of the output image, an evaluation value in a case in which division is performed by the number of each candidate, and to select the number of divided areas of a high evaluation value. In the method using such an evaluation value, the ease of contrast maintaining can be evaluated before compression of the D range, and the number of divided areas suitable for the input image can be specified. Note that, when fine area division is performed, it may be not easy to maintain the contrast in a wide frequency range. Hence, the number of divided areas can also be set by performing evaluation based on the size of an area in addition to the size of the range of the brightness values of the input image and the size of the range of the brightness values of the output image. Accordingly, the contrast can be maintained, and the number of divided areas can be set such that the area size becomes as large as possible. In addition, the evaluation can be performed further based on the variance of brightness values in each area after division. This makes it possible to more correctly determine the ease of contrast maintaining. Additionally, the size of an area (that is, the number of divided areas) after division, considering the visual characteristic of a human, can be decided based on an observation condition in addition to the size of the range of the brightness values of the input image and the size of the range of the brightness values of the output image. Accordingly, the number of divided areas can be decided in consideration of the frequency that should maintain the contrast in accordance with the contrast sensitivity viewed by a human. It is, therefore, possible to maintain, by D range compression, the contrast of the frequency readily recognized by the visual sensation of a human.

Other Embodiments

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus for executing image processing of converting a first image having a first range of a brightness into a second image having a second range of the brightness narrower than the first range and outputting the second image, the apparatus comprising:
   (A) at least one processor; and
   (B) at least one memory coupled to the at least one processor, wherein the at least one memory stores a computer program that causes, when executed by the at least one processor, the image processing apparatus:
      (a) to obtain information of a size of the first range and information of a size of the second range;
      (b) to divide the first image based on the obtained information such that the number of areas obtained by dividing the first image in a case in which a ratio of the second range to the first range is a first value becomes smaller than the number in a case in which the ratio is a second value smaller than the first value; and
      (c) to set, for each of the areas, relationship information that associates an input brightness value in the first range with an output brightness value in the second range, and converts a brightness value of a pixel included in the first image into a brightness value of a pixel of the second image based on the relationship information, and to output the second image obtained by the conversion.

2. The apparatus according to claim 1, wherein the computer program further causes, when executed by the at least one processor, the image processing apparatus to set the number based on the obtained information, and
   as the ratio of the size of the second range to the size of the first range becomes smaller, the number is set to a larger value.

3. The apparatus according to claim 1, wherein the computer program further causes, when executed by the at least one processor, the image processing apparatus to set the number based on the obtained information, and
   in setting of the number,
   a plurality of candidates of the number of areas are set,
   for each of the plurality of candidates, an evaluation value in a case in which the first image is divided into the areas as many as the number of the candidate is obtained based on the obtained information, and
   based on the evaluation value, one candidate of the plurality of candidates is set as the number of areas that should be obtained by dividing the first image.

4. The apparatus according to claim 3, wherein the first image is divided by the number of the candidate into candidate areas,
   the more the candidate areas for which a variance of brightness values is small there are, the higher value the evaluation value has.

5. The apparatus according to claim 3, wherein the larger a size of the area obtained by dividing the first image by the number of the candidate, the higher value the evaluation value has.

6. The apparatus according to claim 1, wherein the computer program further causes, when executed by the at least one processor, the image processing apparatus to set the number based on the obtained information, and
   the number is set based on a size of the area determined in accordance with the ratio of the size of the second range to the size of the first range.

7. The apparatus according to claim 6, wherein the size is specified based on the ratio and an observation condition of the second image.

8. The apparatus according to claim 7, wherein the observation condition includes a resolution and an observation distance of the second image.

9. A control method of controlling an image processing apparatus for executing image processing of converting a first image having a first range of a brightness into a second image having a second range of the brightness narrower than the first range and outputting the second image, the method comprising:
   obtaining information of a size of the first range and information of a size of the second range;
   dividing the first image based on the obtained information such that the number of areas obtained by dividing the first image in a case in which a ratio of the second range to the first range is a first value becomes smaller than the number in a case in which the ratio is a second value smaller than the first value; and setting, for each of the areas, relationship information that associates an input brightness value in the first range with an output brightness value in the second range, and converting a brightness value of a pixel included in the first image into a brightness value of a pixel of the second image based on the relationship information, and outputting the second image obtained by the conversion.

10. The method according to claim 9, further comprising setting the number based on the obtained information,
wherein, as the ratio of the size of the second range to the size of the first range becomes smaller, the number is set to a larger value.

11. The method according to claim 9, further comprising setting the number based on the obtained information,
wherein, in the setting the number,
a plurality of candidates of the number of areas are set, for each of the plurality of candidates, an evaluation value in a case in which the first image is divided into the areas as many as the number of the candidate is obtained based on the obtained information, and
based on the evaluation value, one candidate of the plurality of candidates is set as the number of areas that should be obtained by dividing the first image.

12. The method according to claim 11, wherein the first image is divided by the number of the candidate into candidate areas,
the more the candidate areas for which a variance of brightness values is small there are, the higher value the evaluation value has.

13. The method according to claim 11, wherein the larger a size of the area obtained by dividing the first image by the number of the candidate, the higher value the evaluation value has.

14. The method according to claim 9, further comprising setting the number based on the obtained information,
wherein the number is set based on a size of the area determined in accordance with the ratio of the size of the second range to the size of the first range.

15. The method according to claim 14, wherein the size is specified based on the ratio and an observation condition of the second image.

16. The method according to claim 15, wherein the observation condition includes a resolution and an observation distance of the second image.

17. A non-transitory computer-readable storage medium that stores a program configured to cause a computer provided in an image processing apparatus for executing image processing of converting a first image having a first range of a brightness into a second image having a second range of the brightness narrower than the first range and outputting the second image:

to obtain information of a size of the first range and information of a size of the second range;

to divide the first image based on the obtained information such that the number of areas obtained by dividing the first image in a case in which a ratio of the second range to the first range is a first value becomes smaller than the number in a case in which the ratio is a second value smaller than the first value; and to set, for each of the areas, relationship information that associates an input brightness value in the first range with an output brightness value in the second range, and converts a brightness value of a pixel included in the first image into a brightness value of a pixel of the second image based on the relationship information, and output the second image obtained by the conversion.

* * * * *